Nov. 7, 1967 T. A. RICH 3,351,759
APPARATUS FOR DETERMINING AEROSOL PARTICLE SIZE
COMPRISING A COMBINED DIFFUSER-DENUDER
Filed Aug. 4, 1964 2 Sheets-Sheet 1

Inventor:
Theodore A. Rich,
by Charles W Helzer
His Attorney.

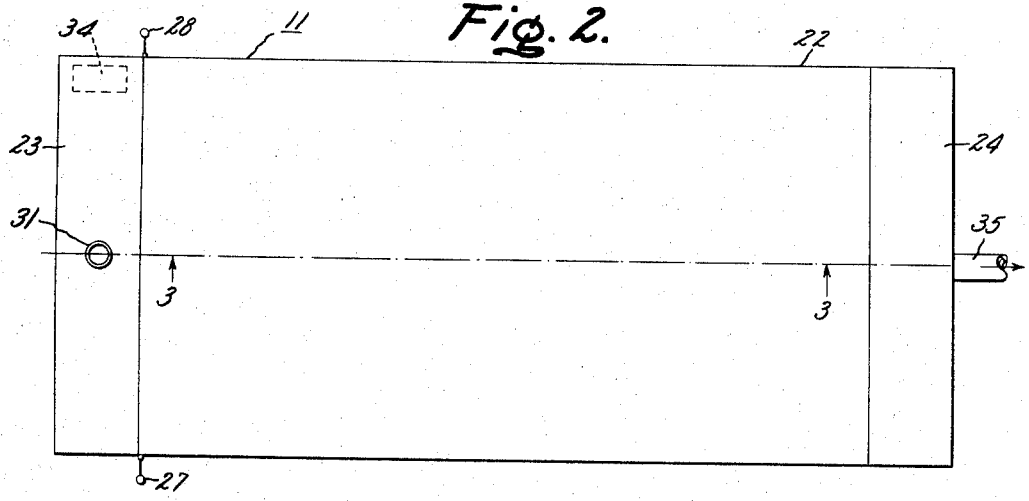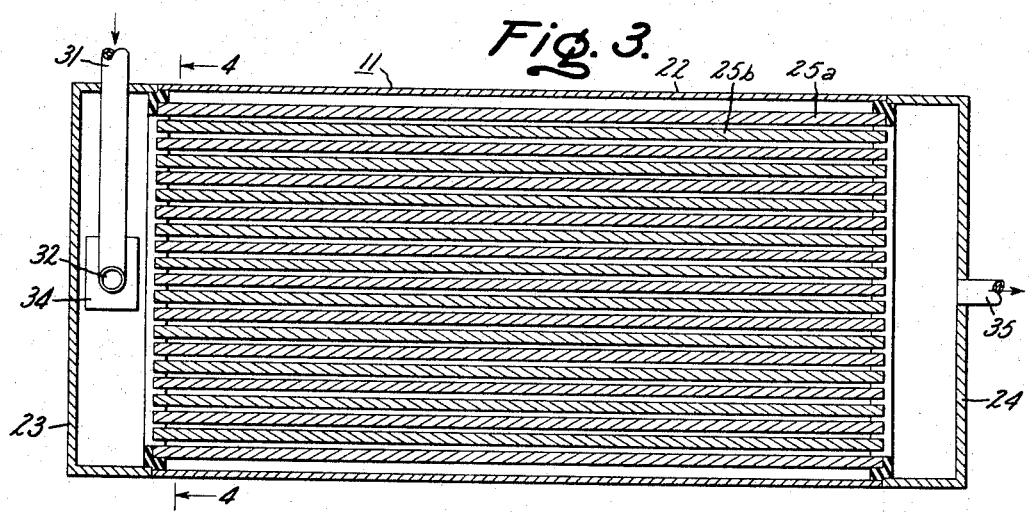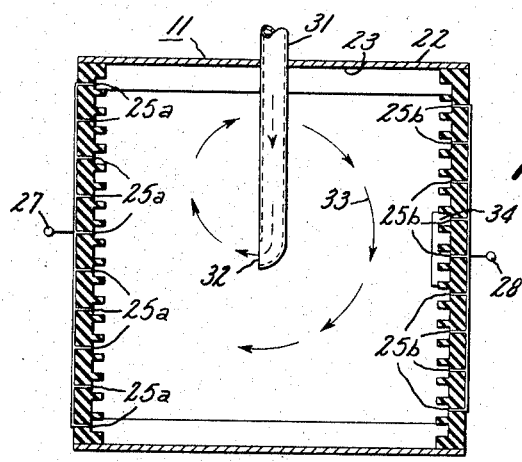

United States Patent Office 3,351,759
Patented Nov. 7, 1967

3,351,759
APPARATUS FOR DETERMINING AEROSOL PARTICLE SIZE COMPRISING A COMBINED DIFFUSER-DENUDER
Theodore A. Rich, Scotia, N.Y., assignor to General Electric Company, a corporation of New York
Filed Aug. 4, 1964, Ser. No. 387,468
7 Claims. (Cl. 250—83.6)

This invention relates to a new and improved combined diffuser-denuder, and to an apparatus employing such combined diffuser-denuder for determining abnormal aerosol particle size distribution characteristics.

Because it is essential to ascertain approximately the size distribution of the aerosols present in any given community from the standpoint of evaluating the health hazards of that community, the problem of easily and accurately (within reasonable bounds) ascertaining size distribution of aerosols has become acute. The existing techniques for determining the size distribution of any given aerosol are extremely sophisticated requiring numerous complex mathematical calculations, and in addition the techniques require considerable skill in making the measurements and observations on which such calculations are based. Just recently the size distribution of a model aerosol has been devised based on numerous measurements carried out in a number of representative communities over a number of years. This model aerosol is one which is considered to be a norm for these communities so that it can be used as a reference against which a sample aresol found in the atmosphere of any given community at any particular time can be compared to determine how far from the norm the sample aerosol deviates. To implement reasonably accurate and easily conducted comparison measurements of this nature, the present invention was devised.

Using the above-mentioned model aerosol as a basis for design, a unique combined diffuser-denuder has been devised as well as apparatus employing the combined diffuser-denuder. These devices comprise the present invention, and can be employed in carrying out the desired comparison measurement method mentioned above. Accordingly, it can be appreciated that the provision of this unique combined diffuser-denuder and measurement apparatus makes possible an easy and relatively accurate comparison type measurement of the size distribution of the aerosols in the air over any given community at a particular time. Using this comparison measurement, one can then readily determine how much and in what sense (that is whether the particles are larger or smaller) the sample aerosol deviates from the norm. With this readily obtained information, an informed and more intelligent decision can then be made regarding the need for a more rigorous analysis of the aerosols in the community being monitored using the more elaborate and involved classical size measuring techniques mentioned earlier.

It is therefore the primary object of the present invention to provide a new and improved combined diffuser-denuder which eliminates any loss in the denuder due to diffusion.

Another object of the invention is to provide an instrument having the above characteristics which works on a relatively low voltage (in the neighborhood of 100 volts) in contrast to the higher voltages required for existing denuding equipment (usually around 10,000 volts).

A still further object of the invention is the provision of apparatus employing the novel combined diffuser-denuder which makes possible the securing of three readily obtained measurements carried out under field conditions (as opposed to idealized laboratory conditions) which then by very simple calculation provides comparison information regarding the size distribution of the aerosol being measured with respect to the model aerosol.

In practicing the invention a new and improved combined diffuser-denuder apparatus is provided which includes in combination a diffusion box comprised by a gas-tight housing having a plurality of electrically conductive spaced-apart collecting members supported therewithin. One set of alternate spaced-apart collecting members are electrically interconnected and are insulated electrically from the remaining set of alternate spaced-apart collecting members which likewise are electrically interconnected. Input means are operatively connected to the diffusion box housing for introducing a gaseous sample to be treated into the space between the spaced-apart collecting members. A means is provided for mounting a source of equalizing radiations within this input means in order to place any sample aerosol in electrical equilibrium prior to the aerosol being transmitted through the combined diffuser-denuder apparatus. The apparatus is completed by an output means operatively connected to the housing for collecting the various portions of the gaseous sample passing through the various spaces between the spaced-apart collecting members, and for transmitting the collected sample to a common measurement point.

In addition to the above combined diffuser-denuder apparatus is provided for determining aerosol particle size distribution which includes in combination a combined diffuser-denuder having the above characteristics. A condensation nuclei meter has its input operatively connected to the output of the combined diffuser-denuder, and selectively operable bypass means are connected between the input means of the combined diffuser-denuder and the input of the condensation nuclei meter for selectively bypassing the gaseous sample to be monitored around the combined diffuser-denuder. The apparatus is completed by selectively operable switching means for selectively supplying an electric potential to the combined diffuser-denuder to cause it to operate in its denuding mode of operation.

Other objects, features, and many of the attendant advantages of this invention will be appreciated more readily as the same becomes better understood by reference to the following detailed description when considered in connection with the accompanying drawings, wherein like parts in each of the several figures are identified by the same reference character, and wherein:

FIGURE 2 is a plan view of the novel combined diffuser-denuder comprising a part of the present invention;

FIGURE 3 is a sectional view of the novel combined diffuser-denuder taken through plane 3—3 of FIGURE 2;

FIGURE 4 is a cross sectional view of the novel combined diffuser-denuder taken through plane 4—4 of FIGURE 3;

Figure 1:
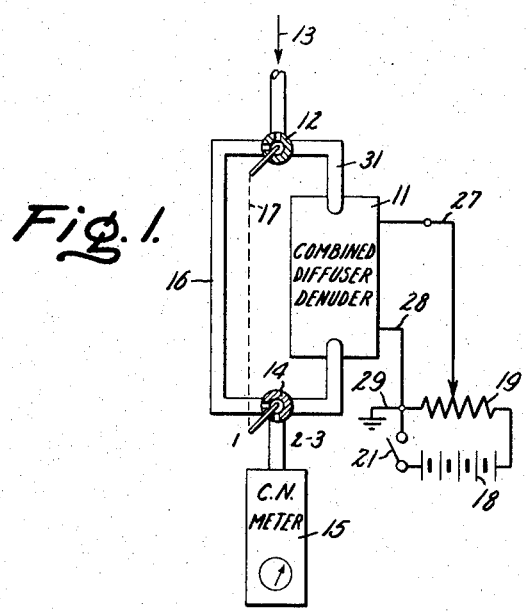
FIGURE 1 is a schematic functional diagram of an apparatus comprised in part by a novel combined diffuser-denuder and used in determining abnormal aerosol particle size distribution characteristics in accordance with the present invention.
Figure 6:
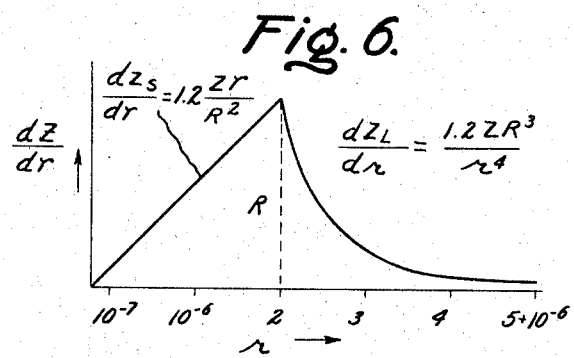
Figure 7:
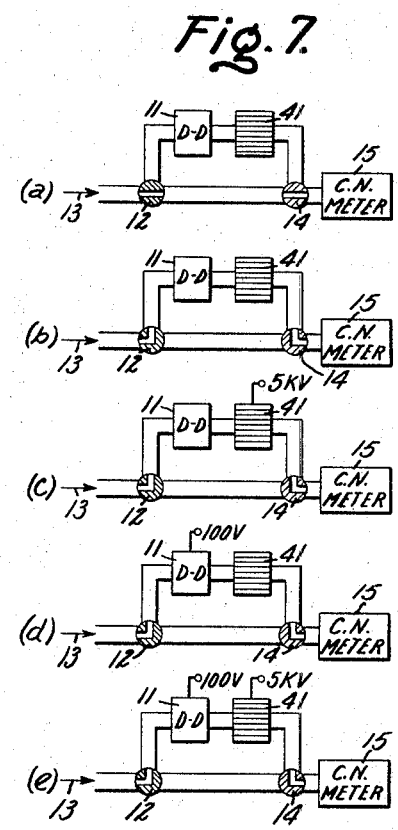

FIGURE 6 is a plot of the particle size versus change in number of particles per change in particle size of a model aerosol employed in calculating the parameters of the combined diffuser-denuder of FIGURES 2–4; and FIGURE 7 is a series of schematic illustrations of a modified form of the apparatus of FIGURE 1 depicting several different modes of operation of the modified apparatus used in experimentally verifying the operation of the present invention.

FIGURE 1 of the drawings is a schematic illustration of one form of equipment made possible by the present invention. The equipment shown schematically in FIGURE 1 is comprised by a combined diffuser-denuder apparatus 11 which has its input connected through a two-way selecting valve 12 to a sample source of aerosol particles indicated by the arrow 13. The output from the combined diffuser-denuder 11 is connected through a selective two-way valve 14 to the input of a conventional condensation nuclei meter 15. The two-way selector valves 12 and 14 are interconnected through a straight length of conduit 16 so that by proper selective operation of the two-way valves 12 and 14, which are mechanically interconnected as indicated by the dotted lines 17, the sample aerosol particles 13 may be selectively caused to travel through the combined diffuser-denuder 11 to the condensation nuclei meter 15, or to travel straight through the conduit 16 to the input of condensation nuclei meter 15. The combined diffuser-denuder 11 is electrically connected to a low voltage potentiometer comprised by a 100 volt battery 18 connected across a variable resistor 19. The variable contact arm of variable resistor 19 is connected to one electric power supply terminal 27 of the combined diffuser-denuder 11, and the remaining power supply terminal 28 of the combined diffuser-denuder is directly connected to a grounded terminal 29 of variable resistor 19. By this arrangement low voltage electric power may be selectively applied to the combined diffuser-denuder by actuation of a selector switch 21 connected in series circuit relationship with the battery source 18 and resistor 19.

The condensation nuclei meter 15 preferably is of the automatically operating type capable of providing an output measurement indicative of the count of number of aerosol particles contained in a unit sample of atmosphere for areosol particles having sizes ranging from molecular dimensions (i.e. particles having an effective radius of about $10^{-7}$ centimeters) to sizes in the neighborhood of $2 \times 10^{-3}$ centimeters in radius. One suitable condensation nuclei meter suitable for use with the arrangement of FIGURE 1 is illustrated and described in United States Patent 2,684,008, issued July 20, 1954, entitled "Method and Apparatus for Measuring the Concentration of Condensation Nuclei."

The details of construction of the diffuser-denuder apparatus 11 are shown in FIGURES 2–4 of the drawings. The diffuser-denuder 11 is comprised by what could be considered to be a conventional diffusion box formed by a gastight housing 22 which includes an input plenum chamber 23 that comprises an input means into the housisg 22. Housing 22 is further comprised by an output plenum chamber 24 which constitutes an output means from the housing. Physically supported within the housing 22 between the input and output plenum chambers 23 and 24 are a plurality of electrically conductive spaced-apart collecting members 25a and 25b. The collecting members 25a and 25b comprise flat parallel plates which extend along the full length of the housing 22 between the input and output plenum chambers 23 and 24 in the longitudinal direction of the flow of particle bearing gases through the diffusion box, and extend for the width of the diffusion box housing 22 in a direction transverse to the flow of aerosol particle bearing gas through the housing 22. Preferably, there are some 19 collecting members 25a and 25b altogether with the collecting members being on the order of one inch thick and being spaced apart a distance of one-sixteenth of an inch. For best results over the particle size range indicated above, the diffuser-denuder would have a dimension extending in the direction of flow of the sample gases being monitored of about 12 inches. As best shown in FIGURE 4 of the drawings, the set of alternate spaced-apart collecting members 25a are electrically interconnected to a common terminal 27, and are electrically insulated from the remaining set of alternate collecting members 25b which are electrically interconnected to a common terminal 28. Hence, an electric field gradient may be established between the adjacent collecting members 25a and 25b by connecting a source of electric potential across the two terminals 27 and 28 as shown in FIGURE 1. Preferably, one of the two terminals such as 28 may be grounded as shown at 29 in FIGURE 1. Additionally, while flat parallel plate collecting members have been specifically described, it is believed obvious that a plurality of concentrically arranged cylinders could also be employed in the construction of the diffuser-denuder.

The gaseous samples to be treated by the combined diffuser-denuder 11 are introduced into the input plenum chamber 23 through an input conduit 31. As best shown in FIGURES 3 and 4, the input conduit 31 extends down to about the center of the input plenum chamber 23 and has a tangential outlet opening 32 which causes the gaseous sample being introduced into the input plenum chamber 23 to enter into the chamber in a swirling vortex as indicated by the arrows 33. Also mounted in the input plenum chamber 23 is a source of radiation 34 which may comprise, for example, any commercially available alpha particle emission source such as the "Static Master" obtainable through phonograph supply houses. Upon being introduced into the input plenum chamber 23, an aerosol particle containing gaseous sample is caused to pass through the radiations emitted from the source 34 for the purpose of bringing the aerosols in the sample to electrical equilibrium. When normal aerosols are brought to electrical equilibrium in this manner, approximately 50% of the particles contained in the aerosol will be electrically charged. It is necessary to bring the aerosol to charge equilibrium because it is only under this condition that the fraction charged is an index of size. If the varying sample aerosols are not brought to electrical equilibrium, then their varying electrical charges will enter into the measurements observed thus throwing off the efficacy of these measurements in carrying out the comparison measurement method of size distribution herein disclosed. After being thus brought to electrical equilibrium, the sample aerosol then flows through the space between the sets of collecting members 25a and 25b where a certain percentage of the particles are collected, and the remainder flow out of the output plenum chamber 34 through the exit conduit 35 and two-way valve 14, to the condensation nuclei meter 15 of the equipment shown in FIGURE 1.

Figure 5:
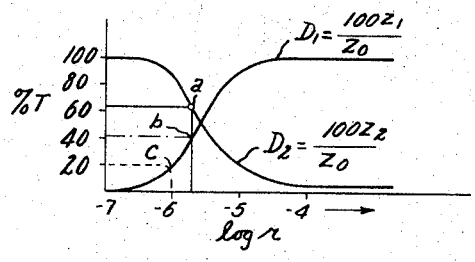
FIGURE 5 is a plot of the particle size versus percent change in transmission of aerosol particles for a combined diffuser-denuder such as shown in FIGURES 2–4, and illustrates the transmission characteristics of a typical combined diffuser-denuder.

The operating characteristics of the combined diffuser-denuder 11 are illustrated in the graph of FIGURE 5 of the drawings. It should be noted that when the combined diffuser-denuder is not energized with an electric potential from the potentiometer 18, 19, the device operates as a conventional diffusion box such as that described in the paper entitled "Experiments With Condensation Nucleus Size Spectrometers," T. A. Rich, L. W. Pollak, and A. L. Metnieks, reprinted from the Review Geofisica Pura e Applicata, Milan, vol. 46 (1960/II), pp. 145–163. With the combined diffuser-denuder 11 adjusted to operate only as a diffusion box (that is without an electric potential applied from potentiometer 18, 19), its transmission characteristic will be similar to that shown by curve $D_1$ of FIGURE 5. Curve $D_1$ is a plot of the percent transmission of particles per cubic centimeter through the combined diffuser-denuder 11 when operated only as a diffusion box. As can be readily determined from an examination of curve $D_1$, only the smallest particles having a radius in the range of $10^{-7}$ to $10^{-4}$ centimeters are eliminated by diffusion in the diffusion box. This is to be expected since a loss of particles in the combined diffuser-denuder when operated as a diffusion box alone occurs solely through diffusion of the particles to the collecting members as a result of Brownian motion which, for the dimensions assumed here is only appreciable for the smaller molecular sized particles in the size range mentioned above. As would be expected, as the particle size becomes larger the Brownian motion is reduced, the number lost through diffusion decreases, and the percent transmitted through the box 11 and sensed by CN meter 15 increases. Accordingly, it can therefore be said that the curve $D_1$ represents a plot of the relation $100Z_1/Z_0$ where $Z_0$ is the total number of aerosol particles contained in a cubic centimeter of sample gas (i.e. $Z_0$=total particles/cc.), and $Z_1$ is the number of aerosol particles contained in a cubic centimeter of sample gas after the sample gas has passed through the combined diffuser-denuder 11 operated only as a diffusion box (i.e. $Z_1$=No. of particles/cc. with diffusion only).

Curve $D_2$ of FIGURE 5 illustrates the percent transmission versus size characteristics of the combined diffuser-denuder 11 when the device has applied to it an electric potential from the potentiometer 18, 19 by closing the switch 21 of the equipment shown in FIGURE 1. With the electric potential applied to the combined diffuser-denuder 11 a certain percentage of the aerosol particles contained in a cubic centimeter of a sample gas will be withdrawn from the sample as a result of the electric field gradient existing between adjacent collecting plates 25a and 25b of the combined diffuser-denuder. From an examination of curve $D_2$, it can be seen that this electric field gradient has little or no effect in removing the smaller size particles within the size range having a radius of from $10^{-7}$ to about $10^{-6}$ centimeters. Thereafter, with increasing size the percent transmitted through the combined diffuser-denuder when thus electrically energized falls off rapidly until particles having a radius larger than $2\times10^{-3}$ centimeters are almost 100 percent collected. The curve $D_2$ can then be said to be defined by the expression $100Z_2/Z_0$ where $Z_2$ is the number of particles transmitted to the condensation nuclei meter 15 after passing through the combined diffuser-denuder when the apparatus is energized with an electric potential (i.e., $Z_2$=No. of particles with diffusion and denuding). The value $Z_0$ is of course obtained by suitable actuation of selector valves 12 and 14 of the equipment shown in FIGURE 1 to cause the sample gas 13 to pass directly into the CN meter 15 through the conduit 16.

The manner of operation of the combined diffuser-denuder apparatus 11 can be better understood after a consideration of the following discussion. From an examination of the curves shown in FIGURE 5, it can be appreciated that the combined diffuser-denuder 11 when operated as a diffusion box alone, or when operated in its denuding mode of operation, removes aerosol particles from the sample as a function of size. This is to be expected since both conventional diffusion boxes and conventional denuders have removed particles as a function of size. The problem in the past with conventional denuders, however, has been in the design of these denuders to avoid diffusion losses. As can be readily appreciated, in the past the loss in conventional denuding apparatus of particularly the smaller sized aerosol particles, has created serious problems of design. Conventional practice has been to so design the denuder as to minimize the loss in the denuder of smaller sized particles, but no technique has ever been evolved for completely eliminating such loss. In order to minimize such losses, conventional design techniques have employed very high voltage power supplies on the order of 5 to 10 kilovolts applied to the denuder collecting plates in order to cut down the diffusion loss for a given effectiveness of denuding action. The present invention very effectively sidesteps this problem by so designing the diffusion box that the denuding action can be accomplished with the same apparatus used to obtain the loss through diffusion measurement thereby in effect providing an ideal denuder having zero losses due to diffusion.

That the above discussed result is indeed accomplished by the present invention, is believed to be established by the following observations depicted by the schematic arrangements shown in FIGURES 7a through 7e of the drawings. In FIGURE 7a a sample aerosol indicated by arrow 13 is supplied through the selector valves 12 and 14 to the condensation nuclei meter 15 directly without first passing through the combined diffuser-denuder 11 or a conventional denuder 41 connected in series with it. The reading obtained by the condensation nuclei meter 15 will then provide an indication of the total number of aerosol particles contained in the sample. In FIGURE 7b the sample gas is supplied through a series connected combined diffuser-denuder 11 and conventional denuder 41 to condensation nuclei meter 15 by proper setting of the selector valves 12 and 14 with neither 11 or 41 being electrically energized. The reading obtained by the condensation nuclei meter 15 then provides an indication of the number of aerosol particles removed from the sample by diffusion in the combined diffuser-denuder 11 as well as by diffusion in the conventional denuder 41. In FIGURE 7c the sample gas flow through the equipment is the same as the arrangement shown in FIGURE 7b; however, a 5 kilovolt potential is applied to the conventional denuder 41. As a consequence of this arrangement, the reading on the condensation nuclei meter 15 will provide an indication of the number of aerosol particles taken out by the conventional denuder 41 after diffusion. The arrangement shown in FIGURE 7d of the drawings is similar to the equipment arrangement shown for FIGURE 7b with the exception that a relatively low voltage 100 volt potential is applied to the combined diffuser-deunder apparatus 11 with no potential being applied to the conventional denuder 41. As a result of this measurement, the reading on the condensation nuclei meter 15 will provide an indication of the number of aerosol particles taken out by simultaneous diffusion and denuding in the combined diffuser-denuder 11 and by diffusion alone in the conventional denuder 41. FIGURE 7e of the drawings depicts a fifth setting of the equipment wherein the selector valves 12 and 14 are set to cause the sample gas 13 to pass through both the combined diffuser-denuder 11 and series connected conventional denuder, a 100 volt electric potential is applied to the combined diffuser-denuder 11, and a five kilovolt potential is applied to the conventional denuder 41. As a consequence of this arrangement, the condensation nuclei meter reading 15 will provide an indication of the number of aerosol particles removed from the sample with all equipments working.

The table below lists the results obtained with the equipment adjusted in the manner depicted by FIGURES 7a through 7e. In this table, the number of aerosol particles counted in a cubic centimeter of sample gas is recorded for each test with Test 1 corresponding to the equipment arrangement of FIGURE 7a, Test 2 corresponding to the equipment arrangement of FIGURE 7b, etc.

Test:
| | |
|---|---|
| 1 | 59K |
| 2 | 44K |
| 3 | 25K |
| 4 | 25K |
| 5 | 25K |

From a consideration of the above test results, it can be appreciated that the combined diffuser-denuder 11 works like a conventional diffuser followed by a perfect denuder, and it should be noted that it works on a low voltage. As a result, the high voltage (5 kv. to 10 kv.) power supply normally required for a conventional denuder can be eliminated. This results in elimination of a serious source of trouble in the field for aerosol particle measurement equipment due to breakdown of insulation in the high voltage equipment during wet weather, for example, when it might be most desirable to operate the field equipment. It should be noted that the above tests were made with an aged aerosol so that there were no very small particles. The separate denuder then had a negligible diffusion loss.

If a small aerosol was used, there would have been a loss in the separate denuder that would have required some correction.

While the above test results do provide conclusive evidence that the combined diffuser-denuder does work, the following explanation may be helpful in understanding why it works. Assume that one were given a hypothetical monodisperse aerosol, and that for this hypothetical monodisperse aerosol the diffusion measurement arrangement of FIGURE 7b provided an indication that 70% of the particles were transmitted through the equipment after diffusion losses occurred, and that the denuding measurement arrangement shown in FIGURE 7c provided an indication that 40% of the particles were transmitted through the equipment after the denuding losses were sustained. If the assumed monodisperse aerosol had 10,000 particles per cubic centimeter, then in the 7b arrangement the CN meter would read (.7×10,000) or 7,000, and in the 7c arrangement it would read (.4×7,000) or 2,800. Next assume that the position of the denuder and diffuser were reversed so that the particles passed through the denuder first. Its output would then be 40% of 10,000 or 4,000, and if these particles then passed through the diffusion box its output .70×4,000 would equal 2,800 particles so that exactly the same result emerges regardless of whether diffusion or denuding occurs first. Hence, in the case of a uniform monodisperse aerosol it makes no difference if one denudes first or uses the diffuser first. From this fact then it isn't too hard to believe that simultaneous diffusion and denuding produces the same result, and that if it works for one size, it also works for a mixture of sizes. In conclusion, it can be stated that the above test results establish that the diffusion loss for an aerosol in electrical equilibrium is essentially the same for charged and uncharged particles in an aerosol in electrical equilibrium. It also shows that the chances of a *given* particle being caught by diffusion is independent of the density of the aerosol. This latter phenomenon can be explained by the fact that since negligible coagulation takes place in the transit of an aerosol through a diffuser there is no interaction between particles.

FIGURE 6 of the drawings illustrates the envelope of a model aerosol devised by the applicant. This model aerosol was used in the design of the combined diffuser-denuder 11 employed in the equipment of FIGURE 1, and comprises a part of the present invention. As can be readily determined from an examination of FIGURE 6, the model aerosol is comprised of particle sizes falling within two major size ranges. The first major size range extends from the smallest particles of molecular dimensions having radii in the order of $5 \times 10^{-7}$ centimeters to an average size radius R on the order of $4 \times 10^{-6}$ centimeters. This range of sizes lies under the curve defined by the expression:

$$\frac{dZ_s}{dr} = \frac{1.2Zr}{R^2} \quad (1)$$

where Z is the total particles per cubic centimeter of sample gas, $Z_s$ is the number of particles per cubic centimeter of the sample gas having a radius less than $r$, R is the average radius of the particles in the model aerosol, and $r$ is the radius of any particular particle in the model aerosol. The second major size range comprising the model aerosol shown in FIGURE 6 lies within the range indicated from particles having an average radius R to particles having a radius on the order of $2 \times 10^{-3}$ centimeters. Particles within this size range lie under the curve defined by the expression:

$$\frac{dZ_L}{dr} = \frac{1.2ZR^3}{r^4} \quad (2)$$

where $Z_L$ is the number of particles per cubic centimeter of gas having a radius larger than $r$. Thus Z=total particles/cc.; $Z_s$=No. of particles/cc.$<R$; $Z_L$=No. of particles/cc.$>R$; and R is the average radius.

It can be demonstrated mathematically that the average radius R also coincides with the breakover radius where the breakover radius is defined as that radius where the model aerosol changes from the relation defined by expression (1) to the relation defined by the expression (2). From the above description, and from a consideration of FIGURE 6 of the drawings, it can be appreciated therefore that the average radius R represents a compromise of the average radius of all of the small particles found under that portion of the envelope defined by expression (1) and the average radius of all of the larger particles found under that portion of the envelope defined by expression (2). It can also be appreciated from a comparison of FIGURES 5 and 6 that the values Z and $Z_0$ correspond. The value $Z_s$ which is the number of particles per cubic centimeter of sample gas having an average radius less than the average radius R for the model aerosol will be reflected in the reading of the condensation nuclei meter 15 when the combined diffuser-denuder 11 is not electrically energized (that is when the selector switch 21 is open). This is in actuality the value $Z_1$=No. of particles/cc. with diffusion only. Further, it can also be appreciated that the value $Z_L$ which represents the number of particles per cubic centimeter of sample gas having an average radius larger than the average radius R for the model aerosol will be reflected in the reading of the CN meter 15 when the combined diffuser-denuder 11 of the equipment shown in FIGURE 1 is energized with an electric potential (that is when the selector switch 21 is closed). This is in actuality the value $Z_2$=No. of particles/cc. with diffusion and denuding.

From the above considerations, it can be appreciated therefore that if a sample aerosol being measured corresponds to the model aerosol used in designing the combined diffuser-denuder 11, then the radius calculated from the diffusion loss in the combined diffuser-denuder 11 will equal substantially the radius calculated from the denuding action of the combined diffuser-denuder 11. If the two radii are not substantially equal, then their ratio will be a function of the size distribution of the sample aerosol, and provides an indication of the deviation of the sample aerosol from the norm established by the model aerosol. These considerations are treated further in the following description of the manner in which the equipment of FIGURE 1 is used to obtain a size distribution comparison measurement.

In carrying out a size distribution comparison measurement with the equipment shown in FIGURE 1, the selector valves 12 and 14 are turned so that the sample gas being monitored first flows through the conduit 16 directly to the condensation nuclei meter 15. With the equipment thus adjusted a reading $Z_0$ is obtained on the condensation nuclei meter 15 which is indicative of the total number of particles contained in a cubic centimeter of the sample gas. After obtaining the first reading $Z_0$, the selector valves 12 and 14 are then turned to direct the sample gas through the combined diffuser-denuder 11 and then into the condensation nuclei meter 15. The second reading is then taken with the selector switch 21 opened. With the equipment thus adjusted, the reading obtained on the condensation nuclei meter 15 will represent $Z_1$ the number of particles per cubic centimeter of sample gas transmitted through the combined diffuser-denuder 11 with diffusion only where the diffusion loss in the combined diffuser-denuder 11 is primarily a function of the flow rate through the combined diffuser-denuder. Thereafter, the selector valves 12 and 14 are left in a position to direct the sample gas flow through the combined diffuser-denuder, and the selector switch 21 is closed so that an electric potential is connected across the two sets of electrically interconnected alternate collecting members **25*a* and 25*b* of the combined diffuser-denuder 11**. It should be noted that this electric potential need be only a relatively low voltage direct current electric potential having a value on the order of 100 volts. With the equipment thus arranged, the number of particles transmitted to the condensation nuclei meter 15 will represent the value $Z_2$ which is equal to the number of particles transmitted with both diffusion loss and denuding loss. Hence, it can be appreciated that the final denuding loss is primarily a function of both the voltage supplied and the flow through the combined diffuser-denuder 11. The effects of flow and voltage on diffusion loss and denuding loss is treated in more detail in the above-identified reference paper by Rich, Pollak, and Metnieks, and is treated further in a second paper by the same authors entitled, "Estimation of Average Size of Submicron Particles From the Number of All and Uncharged Particles," reprinted from the Review Geofisica Pura e Applicata, Milan, vol. 44 (1959/III), pp. 233–241.

Operation of the equipment shown in FIGURE 1 in the above-described manner provides the user with the following three values: $Z_0$ equal to the total number of particles per cubic centimeter of the gaseous sample being analyzed, $Z_1$ equal to the number of particles per cubic centimeter with diffusion only, and $Z_2$ equal to the number of particles with diffusion and denuding. Employing the two terms $Z_2$ and $Z_0$ a percent transmission factor (percent T) can be calculated for the number of particles removed with combined diffusion and denuding from the relation $100Z_2/Z_0$ equal to percent T. Then by employing the two terms $Z_1$ and $Z_0$ a similar percent transmission determination can be obtained from the relation percent $T=100Z_1/Z_0$. Employing the two percent T values thus obtained, the equipment user then refers to the characteristic curve shown in FIGURE 5. If the sample aerosol corresponds reasonably well to the model aerosol identified in FIGURE 6, then the radius obtained from the denuding curve $D_2$ will equal the radius obtained from the diffusion curve $D_1$. To be particular, the percent transmission for denuding should, for example, provide one with an intersection point on curve $D_2$ such as ($a$) which will provide a given radius reading. The percent transmission obtained for the equipment with diffusion only then should intersect the diffusion curve $D_1$ at a point (*b*) such that the two radius readings correspond. If this is indeed true, or within a reasonable range of variation, then it follows that the sample aerosol being monitored corresponds reasonably close to the model aerosol. However, if on the other hand, a wide variation in radius readings is obtained, for example, the loss due to diffusion intersects the curve $D_1$ at a point (*c*) indicating a wide divergence from the model aerosol, then it is known that the sample aerosol does not correspond to the model aerosol thereby indicating a wide divergence from the norm established by the model aerosol.

In order to more fully appreciate the simplicity of the above-described comparison measurement technique using the equipment provided by the present invention, the following discussing is provided based on the experiments described in the two above-referenced articles by Rich, Pollak, and Metnieks. The loss of aerosol particles by diffusion presents an extremely difficult mathematical problem. Only two very simple cases have been solved in history, one involving infinite parallel plates and the second involving cylindrical tubes. The solutions obtained from these mathematical derivations are set forth in the following expressions.

For parallel plates:

$$T=0.915e^{-x}+.059e^{-11.8x}+.026e^{-80x} \qquad (3)$$

with $$x=7.45\frac{\tau D}{d^2}$$

For cylindrical tubes:

$$T=.819e^{-x}+.097e^{6.1x}+.0375e^{-16x} \qquad (4)$$

with $$x=14.6\frac{\tau D}{d^2}$$

Where T is equal to the transmitted fraction, $\tau$ is equal to the average dwell time, $d$ is equal to the minimum dimension, and D is equal to the diffusion coefficient which is equal to $$D=\frac{RT}{N}\frac{\left(1+\frac{\lambda}{r}[.864+.290e^{-1.25^{r/\lambda}}]\right)}{6\pi\eta r}$$

where $d$ is the spacing between the parallel plates or the diameter of the cylinders, R is the gas constant, N is Avogadro's number, $r$ is the radius of the particle, and L is the fractional loss. The above expressions (3), (4), and (5) relate to a hypothetical monodisperse aerosol, and hence to obtain the equivalent information for a mixture of sizes such as are found in the polydisperse aerosols in the atmosphere, one must make many tests with varying flow rates and from the varying diffusion loss attempt to calculate the size distribution. The method is described by Pollak (ibid) as the "exhaustion method" and is quite laborious and not applicable under field conditions since these change far too rapidly to permit accurate work.

From a consideration of expressions (3), (4), and (5) above, and the description of their method of manipulation, it can be appreciated that applicant has made available a very simple equipment for use in carrying out a greatly simplified size distribution comparison measurement method which requires only three readily obtained readings with an easily operated equipment and two simple calculations to provide a user with an indication of whether or not the size distribution of the sample aerosol he is monitoring corresponds to the size distribution of a model aerosol for similar environments. Accordingly, it can be appreciated that the present invention makes possible the ready obtaining of comparison type measurements regarding the size distribution of a sample aerosol being monitored with respect to a model aerosol. These measurements are obtained in such a manner that the effect of diffusion losses occurring while the equipment is operating in its denuding mode of operation are eliminated. Further, operation of the equipment in its denuding mode does not require a high voltage supply but instead a relatively low voltage supply may be used which is not readily susceptible to breakdown under field conditions.

Having described one embodiment of a new and improved combined diffuser-denuder and equipment constructed in accordance with the invention, it is believed obvious that other modifications and variations of the present invention are possible in light of the above teachings. It is therefore to be understood that changes may be made in a particular embodiment of the invention described which are within the full intended scope of the invention as defined by the appended claims.

What I claim as new and desire to secure by Letters Patent of the United States is:

1. A combined diffuser-denuder apparatus including in combination a diffusion box comprising a gastight housing having a plurality of electrically conductive spaced-apart collecting members supported therein, one set of alternate spaced-apart collecting members being electrically interconnected and insulated electrically from the remaining set of alternate spaced-apart collecting members which likewise are electrically interconnected, means for applying an electric field between adjacent collector members, input means operatively connected to said housing for introducing a gaseous sample to be treated into the space between said spaced-apart collecting members, means for mounting a source of equalizing radiations in said input means, output means operatively connected to said housing for collecting the various portions of the gaseous sample passing through the spaces between the spaced-apart collecting members for transmission past a common measurement point and bypass means for selectively conducting gaseous samples from said input means directly to said measurement point.

2. The apparatus set forth in claim 1 wherein the spacing between the collecting members is in the order of .01 to .1 inch and the total collecting area of the collecting members is in the order of 500 square inches to 10,000 square inches.

3. The apparatus set forth in claim 1 further characterized by a source of electrical potential, and selectively operable switching means for selectively connecting the source of electric potential in electric circuit relationship across the two sets of electrically interconnected alternate collecting members.

4. The apparatus set forth in claim 1 wherein the spacing between the collecting members is in the order of .01 to .1 inch and the total collecting area of the collecting members is in the order of 500 to 10,000 square inches, and wherein the apparatus is further characterized by a source of low voltage electric potential in the order of one hundred volts, and selectively operable switching means for selectively connecting the source of low voltage electric potential in electric circuit relationship across the two sets of electrically interconnected alternate collecting members.

5. Apparatus for determining aerosol particle size distribution including in combination a combined diffuser-denuder having input means for introducing a gaseous sample to be monitored into the combined diffuser-denuder, means for mounting a source of equalizing radiations in said input means, a condensation nuclei meter having its input operatively connected to the output of the combined diffuser-denuder, selectively operable by-pass means connected between the input means of the combined diffuser-denuder and the input of the condensation nuclei meter for selectively bypassing the gaseous sample to be monitored around the combined diffuser-denuder, and selectively operable switching means for selectively supplying an electric potential to the combined diffuser-denuder to cause it to operate in its denuding mode of operation.

6. Apparatus for determining aerosol particle size distribution including in combination a combined diffuser-denuder comprised by a diffusion box formed from a gastight housing having a plurality of electrically conductive spaced-apart collecting members supported therein, one set of alternate spaced-apart collecting members being electrically interconnected and insulated electrically from the remaining set of alternate spaced-apart collecting members which likewise are electrically interconnected, input means operatively connected to said housing for introducing a gaseous sample to be treated into the space between the spaced-apart collecting members, means for mounting a source of equalizing radiations in said input means, output means operatively connected to said housing for collecting the various portions of the gaseous sample passing through the spaces between the spaced-apart collecting members for transmission past a common measurement point, a source of low voltage electric potential, selectively operable switching means for selectively connecting the source of low voltage electric potential in electric circuit relationship across the two sets of electrically interconnected alternate collecting members, a condensation nuclei meter having its input operatively connected to the output means from said combined diffuser-denuder, and selectively operable bypass means connected between the input means of the combined diffuser-denuder and the input of the condensation nuclei meter for selectively bypassing a gaseous sample to be monitored around the combined diffuser-denuder.

7. Apparatus for determining aerosol particle size distribution including in combination a combined diffuser-denuder comprised by a diffusion box formed from a gastight housing having an input plenum and an output plenum and a plurality of electrically conductive spaced-apart collecting members supported within the housing and interconnecting the two plenums, one set of alternate spaced-apart collecting members being electrically interconnected and insulated electrically from the remaining set of alternate spaced-apart collecting members which likewise are electrically interconnected, the spacing between the collecting members being in the order of .01 to .10 inch and the total collecting area of the collecting members is in the order of 500 to 10,000 square inches, a source of low voltage electric potential in the order of 100 volts, selectively operable switching means for selectively connecting the source of low voltage electric potential in electric circuit relationship across the two sets of the electrically interconnected alternate collecting members, a source of radiant energy mounted in the input plenum for bringing the aerosols in the gaseous sample being treated to electrical equilibrium, a condensation nuclei meter having its input operatively connected to the output plenum of the combined diffuser-denuder, and selectively operable bypass means connected between the input plenum of the combined diffuser-denuder and the input of the condensation nuclei meter for selectively bypassing the gaseous sample to be monitored around the combined diffuser-denuder.

References Cited

UNITED STATES PATENTS

| | | | |
|---|---|---|---|
| 2,939,006 | 5/1960 | Oswald | 250—44 |
| 3,178,930 | 4/1965 | Moore et al. | 250—44 X |

FOREIGN PATENTS

| | | |
|---|---|---|
| 859,871 | 1/1961 | Great Britain. |

ARCHIE R. BORCHELT, *Primary Examiner.*